Figure 1:
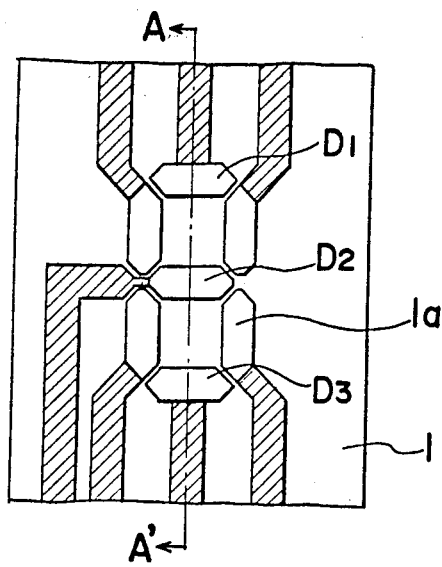

United States Patent [19]
Yano et al.

[11] 4,280,754
[45] Jul. 28, 1981

[54] ELECTROCHROMIC DISPLAY DEVICE AND METHOD OF MANUFACTURE

[75] Inventors: Kozo Yano, Tenri; Yasuhiko Inami, Nishinomiya; Hiroshi Hamada, Tenri; Hisashi Uede, Wakayama, all of Japan

[73] Assignee: Sharp Kabushiki Kaisha, Osaka, Japan

[21] Appl. No.: 924,060

[22] Filed: Jul. 12, 1978

Related U.S. Application Data

[62] Division of Ser. No. 727,448, Sep. 28, 1976, Pat. No. 4,123,841.

[30] Foreign Application Priority Data

Aug. 29, 1975 [JP] Japan .................. 50-118104

[51] Int. Cl.³ .............................. G02F 1/17
[52] U.S. Cl. ............................. 350/357; 29/570
[58] Field of Search ................... 350/357; 29/570

[56] References Cited

U.S. PATENT DOCUMENTS

| | | | |
|---|---|---|---|
| 3,836,229 | 9/1974 | Saurer | 350/357 |
| 3,981,560 | 9/1976 | Heyman et al. | 350/357 |
| 4,086,003 | 4/1978 | Kouchi et al. | 350/357 |
| 4,188,095 | 2/1980 | Nishimura et al. | 350/357 |

*Primary Examiner*—James W. Davie
*Attorney, Agent, or Firm*—Birch, Stewart, Kolasch and Birch

[57] ABSTRACT

An electrochromic display device and method of manufacture is disclosed wherein electrochromic material is deposited in a single layer on a single film of conductive material over the whole area of glass substrate and then the electrochromic material and conductive material are successively etched through a single mask which defines a display segment pattern and remains in position throughout the whole etching process, whereby etched edge portions of the different materials are in excellent alignment and there is therefore small plate area for a reverse emf cell and good display device performance is achieved. The electrochromic material may be etched by the solution employed for developing the photoresist, whereby an etching process step is eliminated.

10 Claims, 4 Drawing Figures

ELECTROCHROMIC DISPLAY DEVICE AND METHOD OF MANUFACTURE

This application is a divisional, of copending application Ser. No. 727,448, filed on Sept. 28, 1976 now U.S. Pat. No. 4,123,841.

The present invention relates to electrochromic display devices and methods of manufacture. More particularly the invention relates to a method for electrochromic a required pattern of electrochromic elements in a simple process.

It is known to constitute a display means by a cell or cells of electrochromic material, which is a material in which a normally absent optical absorption band can be introduced or a normally present absorption band can be altered, by application of an electric field or current. A requirement for the electrochromic process is that there be mixed ionic and electronic conduction, and favored materials are the transition metals or compounds thereof which have the advantage that they permit such mixed conduction at room temperature. These materials are commonly employed in liquid electrochromic systems, in which an electrolyte is contained between a counter electrode and an electrode which has a pattern-defining layer of electrochromic material deposited on the surface thereof which faces the counter electrode and is connected to an external circuit, electrochromic material in contact with the electrolyte becoming colored upon application of a negative pulse to the electrode on which it is coated. One substrate and electrode applied thereon, or both substrates and electrodes, are made of transparent material to enhance legibility of the display resulting from coloration of the different segments of electrochromic material. The pulse applied to cause the electrochromic material to become colored is generally termed the 'activation' or 'write' pulse. Application of a so-called 'bleaching' or 'erasure' pulse, which is a pulse equal in value but opposite in polarity to the write pulse causes the electrochromic material to return to its original condition.

A typical example of employment of a liquid electrochromic system is used thereof to define segments 1a of a segmental display unit 1 such as shown in FIG. 1. It is possible to constitute each separate segment 1a in the display unit 1 by an independent electrochromic cell. However, in such a display unit construction of electrical circuitry becomes rather complex, since a separate activation circuit must be provided for each segment 1a, and it is therefore practical, particularly in small display units, to constitute different segments 1a by different portions of a single electrochromic cell. For example, in FIG. 1 the display segments D1, D2, and D3 lying on the line A-A' are suitably constituted by opposite end portions and a central portion of a single electrochromic cell. According to conventional methods of manufacture such an electrochromic cell may have a construction such as shown in FIG. 2 or FIG. 3.

Figure 2:
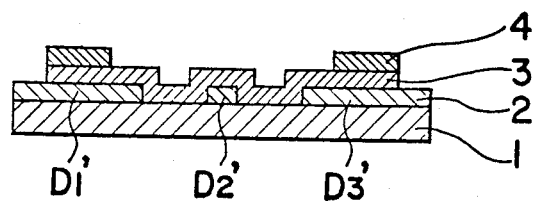
Figure 3:
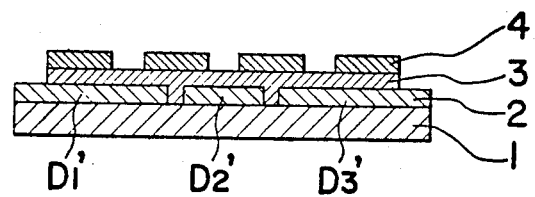

In the construction of FIG. 2, a first electrode 2 is applied on a substrate 1 in segments D1', D2' and D3' which are at least large enough to respectively define the required pattern of display segments D1, D2, and D3 of FIG. 1. The central segment D2' corresponding to the display segment D2 is for example exactly the required size and the outer end segments D1' and D3' corresponding to the display segments D1 and D3 are somewhat larger than required size. The first electrode 2 may of course be applied as a single layer and then etched or applied directly through a mask to form the segments D1', D2', and D3' for example, or produced on the surface of the substrate 1 in a similar known manner. Next, with the exception only of outer end portions of the segments D1' and D3', the entire area occupied by and lying between the electrode segments D1', D2', and D3' is covered by a layer 3 of a transition metal oxide. The uncovered outer end portions of the segments D1' and D3' serve for connection of the electrochromic cell to an external drive circuit not shown. After this, layers 4 of insulatory material are applied on the transition metal oxide layer 3 in line with those portions of the electrode segments D1' and D3' which are in excess of the electrode layer area required in order to constitute the display segments D1 and D3. The remainder of the electrochromic cell consists of spacers and a counter electrode not shown, the spacers being provided between and connecting outer edge portions of the counter electrode and the display segment assembly shown in FIG. 2, and electrolyte, which is contained in the space defined between this display segment assembly, the counter electrode and the spacers.

In this construction, although the only portions of the transition metal oxide layer 3 required for display purposes are those portions thereof which are directly over the portions of the electrode segments D1, D2, and D3, it is necessary that the transition metal oxide layer 3 extend over the whole central area defined by and between the electrode segments D1', D2', and D3', since if it is attempted by conventional methods to apply an individual layer of a transition metal oxide on each of the segments D1', D2' and D3', there is almost inevitably misalignment of edge portions of the transition metal oxide layers and the segments D1', D2' and D3', i.e., at the edge of a transition metal oxide layer and an electrode segment there is produced a step portion, since the transition metal oxide layer covers a larger area than the electrode segment or vice-versa. This is undesirable, since, as is known, a transition metal oxide and conductive electrode material in contact with a common electrolyte may in effect constitute electrodes of an electrochemical reaction and during repeated activation and erasure of the electrochromic material this electrochemical reaction may constitute the source of a reverse electromotive force which, if the plate area of the electrolytic cell is sufficiently large, as is the case when there are step portions at the boundaries of transition metal oxide layers and electrode segments, is strong enough to activate or erase the electrochromic device even in the absence of externally applied activation or erase pulses.

Although an electrochromic display device having the construction shown in FIG. 2 avoids this problem, it has the disadvantage that intermediate portions of the transition metal oxide layer 3, i.e., portions of the layer 3 other than portions thereof directly over the electrode segments D1', D2', and D3', are in contact with the electrolyte and also to a certain extent are subjected to electrical fields resulting from application of successive activation and erasure pulses. As a result of this, after the electrochromic device has been in use for some time, these intermediate portions become colored, and may be the cause of an erroneous display, it being found extremely difficult in practice to restore the material of layer 3 to its original condition.

To avoid this problem it is known to manufacture an electrochromic display device having the construction shown in FIG. 3, to which reference is now had. According to this method of manufacture, segments of the first electrode 2 which are approximately shaped in correspondence to and extend at least over the areas to be occupied by subsequently produced display segments D1, D2, and D3 are evaporated or applied in another known manner on the substrate 1, and a transition metal oxide layer 3 is applied to cover the entire area occupied by and lying between the segments of the electrode 2, with the exception of outer end portions thereof which serve as external connection terminals. After this the required display segments D1, D2, and D3 are defined between layers 4 of insulatory material which are applied over selected areas of the layer 3 and cover all portions thereof other than portions at which display is required to be produced. Thus, electrolyte is prevented from contacting layer 3 portions not required for display purposes and these portions are therefore not liable to be colored, even after prolonged use of the display device. As known, insulatory materials do not permit easy production of patterns therein by etching processes, the insulatory layers 4 defining the required display pattern must be applied through a mask. Therefore, since in the current state of the art of masking and mask registration there are comparatively great restrictions on spacing between adjacent segments, i.e., in this case on density of discrete segments of insulatory material, the abovedescribed method has the disadvantage that it is unsuited to manufacture of electrochromic devices for miniature displays.

It is accordingly an object of the invention to provide a method for accurate manufacture of electrochromic display devices which are efficient in operation and may include high-density display pattern portions.

It is another object of the invention to provide a method for electrochromic display device manufacture which requires few steps and is easy of application.

According to the invention these and other objects are achieved as follows. A first substrate and a second substrate are each coated with a layer of conductive material, thereby to constitute a first electrode on the first substrate and a second electrode on the second substrate. If the electrochromic device is required to be employed in a two-sided display unit both the substrates and both the electrodes are suitably transparent, or one or both substrates and/or electrodes may be opaque and have defined therein transparent window portions corresponding to display segments. If the electrochromic device is employed in a single-side display unit, the first substrate and first electrode, for example, constitute the front of the device and are both transparent, while both the second substrate and the second electrode, or at least one of these elements constituting the rear of the device, are, or is, opaque. In this case if the second electrode is employed to carry subsequently deposited electrochromic material, the electrolyte employed in the device is suitably a clear liquid, whereas if the first electrode is employed to carry the electrochromic material the electrolyte suitably includes a dispersion of barium sulfate, $BaSO_4$, or similar material to constitute a background for improved viewing of a display.

The material employed for the substrates may be for example glass or a synthetic resin such as polyamide resin, polyester resin, acryl resin, or polyvinyl chloride. Examples of suitable material for the electrodes are indium oxide, $In_2O_3$, or stannic oxide, $SnO_2$, to constitute transparent conductive films, or precious metals such as platinum, Pt, palladium, Pd, or gold, Au. One of the electrodes, for example the second electrode, serves as the counter electrode of the device and in some cases may also be required to serve as a reference electrode also. In such a case, the second electrode may be initially applied as a single film by evaporation or similar process and then etched so that it is divided into different portions defining the counter electrode and reference electrode, or the counter electrode and reference electrode portions may be defined directly by depositing the second electrode through a mask defining a suitable pattern.

The first electrode applied on the first substrate is left as a single film and has deposited thereon a layer of electrochromic material, which is preferably the oxide of a transition metal, this being applied by spreading, sintering, evaporation, sputtering, chemical vapour deposition, or similar known technique.

Next, a mask defining a requisite pattern for production of display segments is formed by printing, photolithographic or other known method on the outer surface of the electrochromic material, i.e., the surface thereof opposite to the surface in contact with the first electrode, and then the layer of electrochromic material and the first electrode are successively etched through this mask, the remaining, unetched portions thereof constituting display segments. Since the outer edge portions of the electrochromic material and first electrode assembly are required to be connected to the counter electrode assembly, the outer edge portions of display segments are not defined by etched portions but by insulatory material applied on suitable portions of the electrochromic material subsequent to stripping of the mask. Since the separate layers of insulatory material are provided at comparatively removed locations within the display device, there are no problems relating to the spacing between the adjacent segments. This display segment assembly is connected to the counter electrode or counter electrode assembly through spacers, electrolyte is introduced into the display device, and the device is sealed and connected to an external activation circuit.

Since a single mask remaining in the same position is used, for definition of display segments, accurate alignment of etched edge portions of the electrochromic material layer and the first electrode is easily achieved, step portions at the boundary therebetween are eliminated, and dimensions of display segments may be accurately controlled. Because of this accurate alignment of etched edge portions of electrode and electrochromic material, both may be allowed to be in contact with the electrolyte since, although there is obviously constitution of electrolytic cells and production of some reverse electromotive force, the value of reverse electromotive force produceable by these cells is extremely small, and can be disregarded in comparison to the electrical value of activation and erasure pulses, as the plate area defined by the first electrode in any electrolytic cell is effectively limited to the thickness of the first electrode which is only of the order of 1 $\mu$m. In tests conducted it was found that electrochromic display devices according to the invention, while avoiding the above-noted disadvantages associated with devices constructed according to conventional methods, bring about a marked simplification of manufacturing process, with consequent reduction of cost involved therein.

The etchant employed in the abovedescribed process need not, of course, be the same for both the electrochromic material and the first electrode, but the mask employed must be such that it is unreactive with both the electrochromic and the first electrode material and also is unreactive with and is not liable to be lifted by etchants employed or solutions of etched material in the etchants. In the method of the invention, when electrochromic material employed is a transition metal oxide, particular advantage is gained by use of masks constituted by positive-type photoresist material, such as the commercially available products of trade names AZ-111 and AZ-119A manufactured by the Shipley Corporation of U.S.A., or of trade name OFFPR manufactured by Tokyo Oka Co., Ltd., of Japan, for example. In this case, the developer solution, of which there are available various types each corresponding to a particular type of photoresist, is basic. In contrast to this transition metal oxides are acidic oxides, and the developer solution can therefore act as an etchant with respect to the transition metal oxide layer. Thus, in the development process effected after the transition metal oxide layer has been coated with the photoresist material and has been dried, by maintaining the developer solution in contact with the transition metal oxide layer after the mask has been defined in the photoresist material the required pattern can be etched directly in the oxide layer. After this post-baking is effected and the electrode film etched by a suitable solution. Thus, the process for producing a required segment-defining pattern is greatly simplified since special etchant for the transition metal oxide layer is unrequired and set-up time is reduced.

Figure 4:
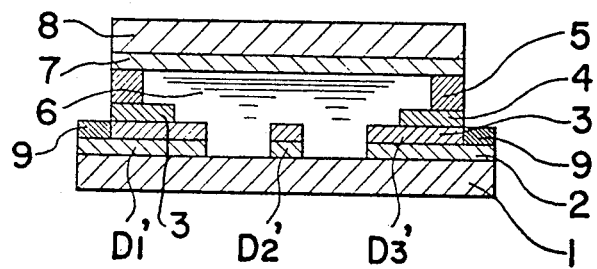

A better understanding of the present invention may be had from the following full description of several specific examples thereof when read in reference to the attached drawings, in which like numbers refer to like parts, and FIG. 1 is a plane view showing an example of used of electrochromic devices in a display unit;

FIGS. 2 and 3 are partial cross-sectional views taken along the line A-A' of FIG. 1 and showing electrochromic devices construction according to conventional methods of manufacture; and FIG. 4 is a cross-sectional view taken along the line A-A' of FIG. 1 and showing construction of an electrochromic device according to the manufacture method of the invention.

EXAMPLE 1

Referring to FIG. 4, there was prepared a plurality of electrochromic display devices, procedure in each case being as follows. There were employed two glass substrates constituting a first substrate 1 and a second substrate 8. A layer of indium oxide, $In_2O_3$, was deposited onto one side of the second substrate 8 by evaporation process thereby to form a second electrode 7, which was subsequently divided into separate portions by conventional photoengraving process to constitute a counter electrode and a reference electrode.

An indium oxide film was evaporated onto one side of the first substrate 1 also thereby to form a first electrode 2. Layers 9 of ferro-chrome, Fe-Cr, intended to permit soldered connection of external activation circuit leads in the completed electrochromic device were evaporated onto outer edge portions of the exposed surface of the first electrode 2. At this stage of the electrochromic device manufacture there is no need for precise control over dimensions of the ferro-chrome layers 9, since the layers 9 may be subsequently etched to form connection studs simultaneously with etching of the first electrode 2, as described below. This is an advantage in mass-manufacture processes since the layers 9 may be initially applied in approximately-sized strips along opposite edge portions or along a plurality of peripheral portions of the first electrode 2.

The remainder of the exposed surface of the first electrode 2 was then covered by a layer 3 of tungsten trioxide, $WO_3$, deposited by evaporation process. The tungsten trioxide layer 3 and the ferro-chrome layers 9 were coated with the positive-type resist material which is known under the trade name of AZ-119A and is manufactured by the Shipley Corporation, this coat of resist material being applied by spinner. After being dried, the resist material was exposed to a mask pattern defining display segment portions to be formed by the tungsten trioxide layer 3 and first electrode 2 and external lead connection studs to be formed by the ferro-chrome layers 9.

After exposure the resist material was developed by the developer solution known under the trade name of AZ-303A and manufactured by the Shipley Corporation. By maintaining the developer solution in contact with the resist material longer than usual it was made possible to etch the required pattern in the tungstem trioxide layer 3 in a single process step. Ferro-chrome being resistant to the developer solution employed, the layers 9 were bit etched at this stage. Needless to say, however, the manufacturing process is basically the same if the material of the layers 9 is conductive and may also be etched by the developer solution employed.

After a time sufficient to complete etching of the tungsten trioxide layer 3, the developer solution was removed, post-baking was effected, and then, the ferro-chrome layers 9 and the first electrode 2 were etched through the same mask by a liquid mixture of ferric chloride, $FeCl_3$, and hydrogen chloride, $HCl$. As noted above, outer edge portions of the tungsten trioxide layer 3 and of the first electrode 2 are not etched to define boundaries of display segments since these outer edge portions are required to constitute, constructional elements in assembly of the electrochromic device. Therefore, after stripping of the abovedescribed mask, layers 4 of negative type resist material were applied on outer edge portions of the tungsten trioxide layer 3, the negative resist material employed being the commercially available product known under the trade name of KMER and manufactured by the Kodak Corporation of U.S.A., and, in order to facilitate the application process, also being applied on the unetched portions of the ferro-chrome layers 9. The layers 4 of negative resist material were then exposed to light projected through a mask defining the requisite display segment configurations and external connection studs, after which the layers 4 were developed, with the result that those portions of the tungsten trioxide layer 3 required for display purposes were exposed and hence contactable by electrolyte, and other portions thereof remained covered and protected by the negative resist material of the layers 4, the external connection studs also being uncovered. Finally, the first and second substrate assemblies were joined by spacers 5, which also defined side walls and which with respect to the electrochromic device were located inwardly of the external connection layers 9 and first electrode portions supporting the layers 9, electrolyte 6 was introduced into the space defined between the first and second substrate assemblies and the spacers 5 and the electrochromic device, now having the construction shown in FIG. 4 was sealed. The elecrolyte 4 employed in this example was a 10 M solution of lithium prchlorate LiClO4, in methyl ethyl ketone, in which solution was mixed a 1:1 by weight addition fo barium sulfate, BaSO4, to provide a white background for viewal of the electrochromic display.

In an electrochromic display device constructed according to the method of the invention, electrochromic material other than tungsten trioxide may be employed, examples being molybdenum trioxide, MoO3, and titanium dioxide, TiO2. The electrolyte is suitably constituted by an electrolytic substance such as lithium perchlorate dissolved to a concentration of 1.0 m or to saturation in a solvent such as acetone, methyl ethyl ketone, diethyl ketone, methyl propyl ketone, or similar ketone, ethyl acetate, isopropyl acetate, n-propyl acetate, or similar alkyl acetate, or 2-ethoxy ethyl acetate, for example the product known under the trade name of Cellosolve acetate, diethylene glycol monomethyl ether acetate, diethylene glycol monoethyl ether acetate, for example the product known under the trade name of Carbitole acetate, diethylene glycol monobutyl ether acetate, for example the product known under the trade name of butyl carbitole acetate, or similar alkoxy ethyl acetate. If the electrochromic device is employed in a single-side display unit, suitable pigments which are further included in the electrolyte to provide an improved background for viewal of a display include barium sulfate, BaSO4, alumina, Al2O3, titanium dioxide, TiO2, and Zirconium dioxide, ZrO2.

As a specific example, if the resist material employed is AZ-119A, it is suitably applied by roller coater, using Gyrex 9, to a thickness of 3 $\mu$, pre-baked at a temperature of 80° C. for 10 minutes and then exposed for 10 seconds, using light emitted by a 3 KW mercury lamp. The developer solution employed for this material is suitably AZ-303A and using this solution a 2-minute developing process at 25° C. permits etching of the tungsten trioxide layer also. Development is followed by post-baking for 20 minutes at 110°, after which the supporting electrode material is etched. If the electrode material is indium oxide the etchant employed is suitably a solution having a specific gravity of 42° Be' ferric chloride, FeCl3 and concentrated hydrochloric acid, HCl, in a 1:1 ratio by volume. After this the resist material is stripped by means of acetone.

The material of the insulatory layers 4 applied on the electrochromic material 3 may be a material which is applied by spraying or similar process, for example the abovenoted negative-type resist material manufactured by the Kodak Corporation and known under the trade name of KMER, or a resin such as an epoxy resin, for example the product known under the trade designation of Epiform R-2401/H160 and manufactured by Somal Industries Incorporated of Japan, a cellulose resin, for example the product known under the trade designation of WS-120 and mnaufactured by the Soken Chemical Corporation of Japan, or a polyvinyl alcohol resin, or a material which is applied by evaporation process, for example silicon oxide, SiO, silicon dioxide, SiO2, alumina, Al2O3, or magnesium fluoride, MgF2.

The positive type resist applied on the electrochromic material layer 3 and external connection layer or layers 9 and employed for production of a mask defining display segments and external connection studs may be for example any of the products manufactured by the Shipley Corporation and known under the trade designations AZ-111, AZ-119A, AZ-1350, Az-2400, AZ-2415, and AZ-2430, the product known under the trade designation of OFPR and manufactured by Tokyo Oka Co., Ltd., or either of the products known under the trade designations of ISOFINE SR-30 and ISOFINE PR-36 manufactured by the Micro Image Technology Corporation of Japan. For each of these resist materials there is available a special developer solution which may be suitably employed in association therewith.

Evaporation conditions for deposition of a tungsten trioxide film are suitably as follows. The evaporation source is a resistance-heated tungsten crucible, the process chamber is evacuated to a pressure of $5 \times 10^{-4}$ torr, substrate temperature is 350° C., and the tungsten film is dispositied at a rate of 10 A per second to a thickness of 5000 A.

Other examples of electrochromic display devices manufactured according to the method of the invention are as follows.

EXAMPLE 2

An electrochromic device was manufactured employing a 1.0 m solution of lithium perchlorate, LiClO4, in propionitrile as the electrolyte, procedure and materials being otherwise the same as for Example 1.

EXAMPLE 3

An electrochromic display device was manufactured employing a 1.0 m solution of lithium perchlorate, LiClO4, in propylene carbonate as the electrolyte, procedure and materials being otherwise the same as for Example 1.

EXAMPLE 4

An electrochromic display device was manufactured employing molybdenum trioxide, MoO3, as the electrode material, instead of tungsten trioxide WO3, procedure and materials being otherwise the same as for Example 1.

EXAMPLE 5

An electrochromic display device was manufactured employing silicon oxide, SiO, evaporated through a mask as the material of the layers 4, instead of KMER, procedure and materials being otherwise the same as for Example 1.

EXAMPLE 6

An electrochromic display device was manufactured following the procedure of Example 5 except that silicon dioxide, SiO2, was employed in place of silicon oxide, SiO.

EXAMPLE 7

An electrochromic display device was manufactured following the procedure of Example 5 except that alumina, Al2O3, was employed in place of silicon oxide, SiO.

EXAMPLE 8

An electrochromic display device was manufactured following the procedure of Example 5 except that magnesium fluoride was employed in place of silicon oxide, SiO.

Although the present invention has been fully described by way of example, it should be noted that various changes and modifications are apparent to those skilled in the art, it being understood that such changes and modifications should be constructed as included therein unless they depart therefrom.

What is claimed is:

1. An electro-optical display device comprising:
    a pair of conductive electrodes between which an electric field is to be established;
    said pair of conductive electrodes being formed, respectively, on a first and a second substrate, at least one of said substrates being transparent;
    a layer of electrochromic material disposed in contact with one of said electrodes;
    said one electrode and said electrochromic material layer being segmented to form segmented areas, said segmented areas including a required segmented display pattern, the segmented display pattern areas being in contact with said electrolyte;
    the edge portions of said one electrode and said electrochromic material layer which are in contact with said electrolyte being in accurate alignment; and
    an insulating material layer being disposed on and in registry with those portions of said segmented areas exclusive of said segmented display pattern to define the outermost boundaries of said segmented display pattern.

2. A product comprising an electrochromic display device manufactured by the method comprising the steps of:
    preparing a first substrate assembly and a second substrate assembly, at least one of said substrates being transparent;
    applying a first electrode on said first substrate and a second electrode on said second substrate, at least one of said electrodes being transparent and being applied on a transparent portion of said substrate, said second electrode serving as a counter electrode;
    applying a layer of transition metal oxide material on said first electrode;
    initially applying said first electrode and said transition metal oxide layer successively on said first substrate over an area greater that that necessary to define a required display pattern and an external circuit connection pattern thereon;
    forming mask of photoresist material defining said required display pattern on said transition metal oxide layer, said photoresist material being characterized such that a developer solution for said photoresist material is an etchant solution for said transition metal oxide layer exclusive of the underlying said first electrode layer;
    etching said transition metal oxide layer and said first electrode through said mask, in sequence, with said developer solution and an etchant solution peculiar to said first electrode, respectively, thereby producing said required display pattern in said transition metal oxide layer and said first electrode;
    applying at least one layer of insulatory material over those portions of said transition metal oxide layer which are not required for display purposes;
    positioning said first substrate assembly and said second substrate assembly in an electrode facing relationship and joining the assemblies by spacer means; and
    introducing electrolyte into the space defined between said assemblies and said spacer means, said electrolyte being retained in said space.

3. A product comprising an electrochromic display device manufactured by the method as claimed in claim 2, wherein said mask is a photolithographic mask constituted by a positive-type photoresist material and wherein said method includes the further step of developing said mask with a developer solution acting to etch said transition metal oxide layer to produce said required pattern in a single continuous process.

4. A product manufactured by the method of claim 3, wherein said developer solution is alkaline.

5. A product manufactured by the method of claim 4, wherein said first electrode is etched with an acid solution subsequent to the etching of said transition metal oxide layer.

6. A product manufactured by the method of claim 2, wherein said insulation material is placed on said transition metal oxide layer after etching of the latter to said required pattern by:
    stripping said mask from said etched transition metal oxide layer and first electrode;
    applying a negative photoresist material layer over said etched transition metal oxide layer and first electrode;
    exposing said negative photoresist material to a light pattern corresponding to said required pattern; and
    developing said exposed negative photoresist material to form said layer of insulatory material.

7. A product manufactured by the method of claim 6, wherein said mask is a photolithographic mask constituted by a positive-type photoresist material and including the further step of developing said mask with a developer solution acting to etch said transition metal oxide layer to produce said required pattern in a single continuous process.

8. A product manufactured by the method of claim 7, wherein said developer solution is alkaline.

9. A product manufactured by the method of claim 8, wherein said first electrode is etched with an acid solution subsequent to the etching of said transition metal oxide layer.

10. A product manufactured by the method of claims 2, 3, 4, 5, 6, 7, 8, or 9 wherein subsequent to forming said display pattern in said transition metal oxide layer and prior to forming said display pattern in said first electrode layer, said developer solution is removed and post baking is effected.

* * * * *